United States Patent
Kawakami

(10) Patent No.: US 12,273,399 B2
(45) Date of Patent: Apr. 8, 2025

(54) DEVICE, METHOD, PROGRAM, AND INFORMATION PROVISION SYSTEM FOR TELEPHONE NUMBER RESEARCH

(71) Applicant: CLOVER NETWORK COM CO., LTD., Tokyo (JP)

(72) Inventor: Yasunori Kawakami, Tokyo (JP)

(73) Assignee: CLOVER NETWORK COM CO., LTD., Tokyo (JP)

( * ) Notice: Subject to any disclaimer, the term of this patent is extended or adjusted under 35 U.S.C. 154(b) by 0 days.

(21) Appl. No.: 17/760,373

(22) PCT Filed: Oct. 26, 2021

(86) PCT No.: PCT/JP2021/039547
§ 371 (c)(1),
(2) Date: Aug. 9, 2022

(87) PCT Pub. No.: WO2022/123942
PCT Pub. Date: Jun. 16, 2022

(65) Prior Publication Data
US 2023/0291774 A1  Sep. 14, 2023

(30) Foreign Application Priority Data
Dec. 7, 2020  (JP) ................. 2020-202918

(51) Int. Cl.
*H04M 7/00*  (2006.01)
*H04B 1/38*  (2015.01)
(Continued)

(52) U.S. Cl.
CPC ...... *H04L 65/1069* (2013.01); *H04L 65/1016* (2013.01); *H04L 65/65* (2022.05)

(58) Field of Classification Search
CPC ..... H04L 65/1104; H04L 65/65; H04L 45/00; H04L 65/1016; H04L 65/1069;
(Continued)

(56) References Cited

U.S. PATENT DOCUMENTS

2006/0085678 A1* 4/2006 Bouat ................. H04L 65/1104
714/12
2007/0172051 A1* 7/2007 Hoffmann ............. H04M 7/006
379/360

(Continued)

FOREIGN PATENT DOCUMENTS

JP  2009-055512 A  3/2009
JP  2011-135121 A  7/2011
(Continued)

OTHER PUBLICATIONS

International Search Report for corresponding International Application No. PCT/JP2021/039547 mailed Jan. 18, 2022.
(Continued)

*Primary Examiner* — Marcus Smith
*Assistant Examiner* — Jason A Harley
(74) *Attorney, Agent, or Firm* — Chrisman Gallo Tochtrop LLC

(57) ABSTRACT

According to one embodiment, a telephone number research device researches on the usage status of a telephone number in an IMS network, an NGN network, and an IP network without ringing an incoming call by transmitting a specific SIP message that causes call rejection using an IMS interconnection interface or the like for interconnection between carriers. The telephone number research device is connected via an NGN network to a telephone connected to a destination network that is an IMS network or a VoIP network. The telephone number research device adds a first SDP parameter to an INVITE request for the telephone before
(Continued)

10 : TELEPHONE NUMBER RESEARCH DEVICE sending the request to the destination network selected by the NGN network and determines the usage status of the telephone number of the telephone based on a response from the destination network regardless of the type of the destination network.

11 Claims, 10 Drawing Sheets

(51) Int. Cl.

| | | |
|---|---|---|
| *H04L 12/66* | (2006.01) | |
| *H04L 65/1016* | (2022.01) | |
| *H04L 65/1069* | (2022.01) | |
| *H04L 65/1101* | (2022.01) | |
| *H04L 65/40* | (2022.01) | |
| *H04L 65/65* | (2022.01) | |
| *H04M 1/64* | (2006.01) | |
| *H04M 7/12* | (2006.01) | |
| *H04M 19/04* | (2006.01) | |
| *H04W 8/00* | (2009.01) | |
| *H04W 72/04* | (2023.01) | |
| *H04W 80/10* | (2009.01) | |

(58) Field of Classification Search
CPC ...... H04L 65/70; H04W 48/18; H04W 80/10; H04M 15/57; H04M 15/63; H04M 15/60
USPC ...................................... 370/466, 395.2, 252
See application file for complete search history.

(56) References Cited

U.S. PATENT DOCUMENTS

| | | | | |
|---|---|---|---|---|
| 2008/0075075 | A1* | 3/2008 | Hoffmann | H04L 65/1069 370/389 |
| 2013/0007291 | A1* | 1/2013 | Nickols | H04L 65/1069 709/228 |
| 2014/0293833 | A1* | 10/2014 | Hama | H04M 15/60 370/259 |
| 2022/0086198 | A1* | 3/2022 | Cakulev | H04L 65/1063 |

FOREIGN PATENT DOCUMENTS

| | | |
|---|---|---|
| JP | 2012-015605 A | 1/2012 |
| JP | 2014-033474 A | 2/2014 |
| JP | 2017-005466 A | 1/2017 |
| JP | 2017-212534 A | 11/2017 |
| JP | 2018-121165 A | 8/2018 |
| JP | 2018-170709 A | 11/2018 |

OTHER PUBLICATIONS

Written Opinion for corresponding International Application No. PCT/JP2021/039547 dated Jan. 18, 2022 and English translation.

* cited by examiner

10 : TELEPHONE NUMBER RESEARCH DEVICE

FIG.8

TELEPHONE NUMBER HISTORY INFORMATION LAYOUT

| TELEPHONE NUMBER | NEW SUBSCRIBER NUMBER | ERROR CODE | RESEARCH DATE | OTHER LAYER INFORMATION |
|---|---|---|---|---|
| 03-XXXX-XXXX | 03-XXXX-XXXX | XX | YYYYMMDD | XXXX···XXXX |

→ NEW/CONTACT TELEPHONE NUMBER

TELEPHONE NUMBER HISTORY INFORMATION (EXAMPLE)

| | | | | |
|---|---|---|---|---|
| 03-3359-0906 | 00-0000-0000 | IMS | 488(VALID) | 1999 02 15 |
| 03-3359-0906 | 03-4355-8010 | IMS | 410(CHANGED) | 1999 03 10 |
| 03-3359-0906 | 00-0000-0000 | VoIP | 404(MISSING) | 1999 04 18 |
| 03-3359-0906 | 00-0000-0000 | IMS | 488(VALID) | 1999 05 20 |
| 03-3359-0906 | 00-0000-0000 | IMS | 488(VALID) | 1999 06 15 |
| 03-3359-0906 | 00-0000-0000 | VoIP | 480(CANCELLED) | 1999 07 18 |
| 03-3359-0906 | 03-3334-1234 | VoIP | 410(CHANGED) | 1999 08 19 |
| 03-3359-0906 | 00-0000-0000 | IMS | 404(MISSING) | 1999 08 21 |

~15

DEVICE, METHOD, PROGRAM, AND INFORMATION PROVISION SYSTEM FOR TELEPHONE NUMBER RESEARCH

CROSS-REFERENCE TO RELATED APPLICATIONS

This application is a national stage entry of International Application No. PCT/JP2021/039547 filed on Oct. 26, 2021, which claims the benefit of priority to Japanese Application No. JP2020-202918, filed Dec. 7, 2020, the entire disclosures of which are hereby incorporated herein by reference.

TECHNICAL FIELD

The present invention relates to a device, method, program, and information provision system for telephone number research.

BACKGROUND ART

Telephone number research devices are known and disclosed in, for example, Patent Documents 1, 2 and 3 filed by the applicant and already published. Such a telephone number research device is capable of conducting research on the usage status of telephone numbers across the country.

According to the technologies described in the patent documents, the telephone number research device, a caller, is first connected to a public switched telephone network (PSTN), a mobile communication network, or an Internet protocol (IP) telephone network. The telephone number research device then requests for access to subscriber data using the user network interface (UNI) protocol of an integrated service digital network (ISDN) or the like, thereby researching the usage status of a telephone number as to whether the telephone number is "valid", "invalid", "changed", and the like.

Meanwhile, the migration from PSTN to next-generation network (NGN) is being planned worldwide, and it is expected that the digital communication mode provided by the ISDN service will be discontinued in the future. Because of this, there is a need for a telephone number research tool having session initiation protocol (SIP) based connectivity to the NGN network, instead of ISDN UNI connectivity, to ensure a smooth transition to the new system platform.

In recent years, landline telephones have been gradually replaced by IP phones, which leads to a demand for the realization of an IP telephone number research device that can accurately determine the usage status of telephone numbers.

The basic mechanism of IP telephony is greatly different from traditional landline telephone technology. Therefore, as described in, for example, Patent Document 4, a known telephone number research device verifies the validity of an IP phone number by sending an INVITE request with an incorrect description to the IP telephony network (SIP server).

However, through evaluation tests using the technology described in Patent Document 4, the applicant found that it still failed to establish research that was able to accurately determine the usage status of IP phone numbers. Specifically, in Patent Document 4, the subjects of the research are IP phones that are assigned an 11-digit telephone number starting with 050; the research does not cover IP phones that are assigned the same type of telephone number (OAB-J number) as conventional subscriber telephones such as fiber optic phones. Accordingly, in the course of researching the usage status of telephone numbers of IP phones assigned a OAB-J number, the validity cannot be verified due to network rejection or the like.

To cope with this, the applicant has established a technology in which a caller terminal (telephone number research device) transmits a specific SIP message that causes call rejection on IP phones via a UNI connection to the IP telephony network to determine the usage status of telephone numbers in the IP telephony network without using a signal that rings an incoming call. This technology was patented as "telephone number research device, telephone number research method, telephone number research program, and a recording medium" on Mar. 31, 2017 (JP Patent No. 6114901). According to the technology disclosed in the patent, a smooth transition to the new system platform can be achieved with a telephone number research tool having SIP based connectivity to the NGN network.

According to this technology, the telephone number research covers not only IP phones that are assigned an 11-digit telephone number starting with 050 but also those assigned a OAB-J number, such as fiber optic phones, similarly to conventional subscriber telephones. Thus, the research can accurately determine whether telephone numbers are each valid or invalid regardless of the types of IP phones.

PRIOR ART DOCUMENT

Patent Document

Patent Document 1: Japanese Unexamined Patent Publication No. 2009-055512
Patent Document 2: Japanese Unexamined Patent Publication No. 2011-135121
Patent Document 3: Japanese Unexamined Patent Publication No. 2014-033474
Patent Document 4: Japanese Unexamined Patent Publication No. 2012-015605

SUMMARY OF THE INVENTION

Problems to be Solved by the Invention

With the migration from PSTN to NGN, the signaling protocol for the interconnection interface between carriers will also migrate from a common or standard signaling protocol known as signaling system No. 7 (SS7) to a session initiation protocol (SIP). As a result, a specific SIP message from a caller terminal (telephone number research device) will reach the IP multimedia subsystem (IMS) network, NGN network, and IP telephony or Voice over Internet Protocol (VoIP) network.

IMS is a standard for realizing multimedia services where services that have been provided through fixed networks, mobile communications, and the like are IP based and integrated. Mobile communication systems and NGNs are the systems that are built according to the standard.

For this reason, there is a need for a SIP-based telephone number research tool that can establish a UNI connection to the NGN network to determine the usage status of telephone numbers in the IMS and IP telephony (VoIP) networks without a signal that rings an incoming call, using an IMS interconnection interface or the like for interconnection between carriers, to achieve a smooth transition to the new system platform.

The present invention has been made to solve the above problems. It is therefore an object of the present invention to provide a device, method, program, and information provision system for telephone number research to determine the usage status of telephone numbers in IMS and IP telephony (VoIP) networks using an IMS interconnection interface or the like for interconnection between carriers, enabling a smooth transition to the new system platform.

In particular, an object of the present invention is to provide a device, method, program, and information provision system for telephone number research capable of determining the usage status of telephone numbers regardless of the type of the destination network.

Means for Solving the Problems

To achieve the object mentioned above, exemplary aspects of the present invention may be summarized as follows:

(1) According to one aspect of the present invention, a telephone number research device, which is configured to be connected via an NGN network to a telephone connected to at least a destination network that is an IMS network or a VoIP network, comprises: a message exchange controller configured to add a first SDP parameter to an INVITE request for the telephone to be researched, send the INVITE request to the destination network selected by the NGN network, and receive a first response message from the destination network; and a telephone number research determination unit configured to determine the usage status of the telephone number of the telephone based on the first response message. The first SDP parameter includes at least an IPv6 network protocol. An SBC has a function to convert the IPv6 network protocol to an IPv4 network protocol suitable for the destination network when the first SDP parameter is sent from the NGN network to the destination network. The message exchange controller is further configured to: determine that the destination network is the VoIP network when the first response message is "200 OK" or the first SDP parameter has been converted, and determine that the destination network is the IMS network when the first SDP parameter has not been converted and the first response message includes a first error code.

(2) When the first response message is "200 OK" or the first SDP parameter has been converted, the message exchange controller adds a second SDP parameter to an INVITE request for the telephone to be researched upon sending the INVITE request from next time.

(3) The first SDP parameter is a parameter that conforms to the IMS network. The second SDP parameter is a parameter that conforms to the VoIP network.

(4) The first SDP parameter is a parameter that causes call rejection on the telephone connected to the IMS network. The first SDP parameter includes a description of at least one of network protocol, media type, transport protocol, and codec, or a combination thereof.

(5) The first SDP parameter includes a description of all media types: audio, video, and application.

(6) The second SDP parameter is a parameter that causes call rejection on the telephone connected to the VoIP network. The second SDP parameter includes a description of network protocol, media type, transport protocol, and codec, and the transport protocol, the codec, or a combination thereof is used to cause the call rejection since the network protocol (IPv4) and the media type (audio) are fixed.

(7) The SBC has a function to convert the IPv6 network protocol to the IPv4 network protocol suitable for the destination network when the first SDP parameter is sent from the NGN to the destination network. The message exchange controller is further configured to: determine that the destination network is the VoIP network when the first response message is "200 OK" or the first SDP parameter has been converted, and determine that the destination network is the IMS network when the first SDP parameter has not been converted and the first response message includes the first error code.

(8) The telephone number research determination unit is further configured to: determine that the telephone number of the telephone is present when the first response message includes the first error code, and determine that the telephone number of the telephone is missing when the first response message includes a second error code or a third error code.

(9) The telephone number research determination unit is further configured to: determine that the telephone number of the telephone is present when receiving a second response message that includes the first error code from the destination network in response to the second SDP parameter, and determine that the telephone number of the telephone is missing when the second response message includes a third error code.

(10) A system comprises the aforementioned telephone number research device and a user terminal. The telephone number research device further comprises a network interface unit that, in response to a request for telephone number research information as to the telephone from the user terminal, sends information on the usage status of the telephone number of the telephone determined by the telephone number research determination unit via an IP network to the user terminal that has requested the telephone number research information.

(11) A telephone number research method, which is used for researching the usage status of the telephone number of a telephone to be researched with a telephone number research device configured to be connected via an NGN network to the telephone connected to at least a destination network that is an IMS network or a VoIP network, comprises: adding a first SDP parameter to an INVITE request for the telephone to be researched; sending the INVITE request to the destination network selected by the NGN network; receiving a response message that contains the first SDP parameter from the destination network; and determining the usage status of the telephone number of the telephone based on the response message. The first SDP parameter includes at least an IPv6 network protocol. An SBC has a function to convert the IPv6 network protocol to an IPv4 network protocol suitable for the destination network when the first SDP parameter is sent from the NGN network to the destination network. The method further comprises: determining that the destination network is the VoIP network when the response message is "200 OK" or the first SDP parameter has been converted, and determining that the destination network is the IMS network when the first SDP parameter of the response message has not been converted and the response message includes a first error code.

(12) A program, which is executed on a telephone number research device configured to be connected via an NGN network to a telephone connected to at least a destination network that is an IMS network or a VoIP network, causes the telephone number research device to perform at least the following: add a first SDP parameter to an INVITE request for the telephone to be researched, wherein the first SDP parameter includes at least an IPv6 network protocol; send the INVITE request to the destination network selected by the NGN network; receive a response message that contains the first SDP parameter from the destination network; determine the usage status of the telephone number of the telephone based on the response message, determine that the destination network is the VoIP network when the response message is "200 OK" or the first SDP parameter has been converted, and determine that the destination network is the IMS network when the first SDP parameter of the response message has not been converted and the response message includes a first error code.

Effects of the Invention

According to one aspect of the present invention, it is possible to provide a device, method, program, and information provision system for telephone number research to determine the usage status of telephone numbers in IMS and IP telephony networks using an IMS interconnection interface or the like for interconnection between carriers, enabling a smooth transition to the new system platform. In particular, it is possible to provide a device, method, program, and information provision system for telephone number research capable of determining the usage status of telephone numbers regardless of the type of the destination network.

BRIEF DESCRIPTION OF THE DRAWINGS

FIG. 8 is a diagram illustrating an example of the data structure of a recording medium.

MODES FOR CARRYING OUT THE INVENTION

Figure 1:
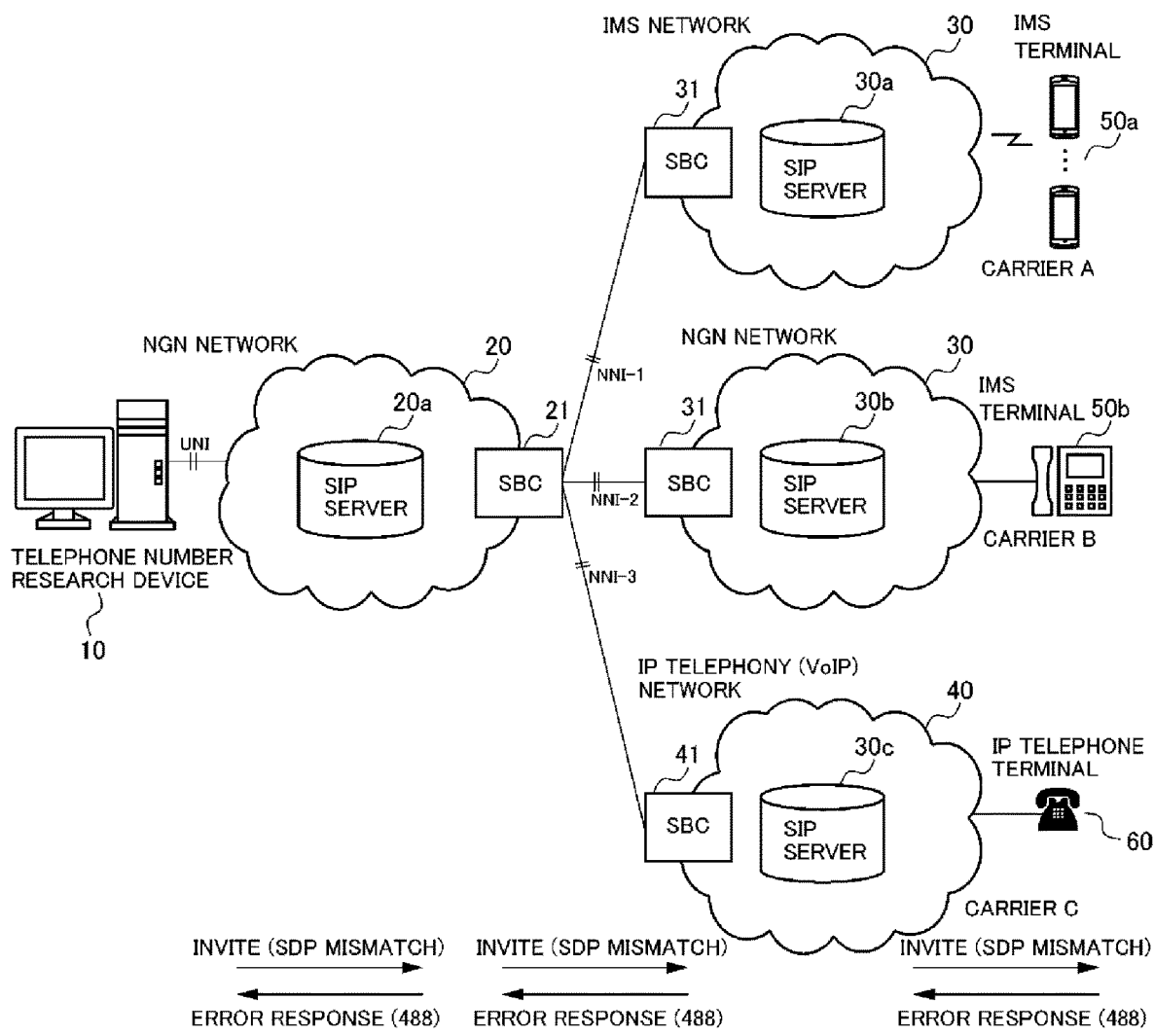
FIG. 1 is a diagram illustrating the network connection of a telephone number research device according to an embodiment of the present invention.

In the following, modes (hereinafter, "embodiments") for carrying out the present invention will be described in detail with reference to the accompanying drawings. Note that like parts are designated by like reference numerals or characters throughout the description of the embodiments.
(Configuration of Embodiment)

FIG. 1 is a diagram illustrating the network connection of a telephone number research device 10 according to an embodiment. As illustrated in FIG. 1, the telephone number research device 10 of this embodiment is connected to a plurality of telephone terminals to be researched (IMS terminals 50a, 50b and an IP telephone terminal 60), which are connected to an IMS network 30 or a VoIP (IP telephony) network 40, via an NGN network 20.

The IMS network 30 is built for each of a mobile network operator/mobile communication carrier (carrier A) and an NGN carrier (carrier B). The IMS terminals 50a and 50b are connected to their respective networks (contract carriers) via SIP servers 30a and 30b managed and operated by the carriers. The IP telephone terminal 60 is connected to the IP telephony network 40 via a SIP server 30c of a VoIP carrier (carrier C).

In the configuration of FIG. 1, when the telephone number research device 10, a caller, dials the telephone number of a receiver telephone terminal, routing is performed in the following order: a SIP server 20a in the NGN network 20, a caller-side session border controller (SBC) 21, a receiver-side SBC 31, 41, the SIP server 30a, 30b, 30c, and the IMS terminal 50a, 50b or the IP telephone terminal 60 as the receiver. At this time, a UNI connection is established between the telephone number research device 10 and the NGN network 20. In addition, an IMS interconnection between carriers is secured between the NGN network 20 and the IMS network 30 via the caller-side SBC 21 and the receiver-side SBC 31, and an interconnection is secured between the NGN network 20 and the VoIP network 40 via the caller-side SBC 21 and the receiver-side SBC 41. With this, a specific SIP message (described later) transmitted from the telephone number research device 10 reaches the IMS network 30.

Note that although FIG. 1 illustrates three networks: IMS network, NGN network, and VoIP network as receiver-side networks, the IMS network to which the IMS terminal 50a is connected and the NGN network to which the IMS terminal 50b is connected are identified by the same reference numeral "30" as they have the same architecture. The common interface for interconnection between IMS carriers via an IP to IP connection is specified in the international standard (TS 29.165).

According to the SIP protocol, negotiation is necessary between terminals as to a method of encoding packets that contain media information, the destination address of the packets, and the like for real-time communication. This negotiation requires a description format called session description protocol (SDP) defined in RFC 4566.

In order to establish a session using SIP, a caller sends a SIP message that contains a description of media information as a request to a receiver, and the receiver replies with a response selecting available media from the media information, thus sharing the media information used for communication. In this manner, sending a SIP message that carries media information to initiate a session is called an offer, and returning information on available media in response is called an answer. This offer/answer model is defined in RFC 3264.

As illustrated in FIG. 1, the telephone number research device 10 of this embodiment sends an SDP offer of the INVITE method (hereinafter, "INVITE request") to the IMS terminal 50a, 50b or the IP telephone terminal 60 to be researched via the NGN network 20 (the SIP server 20a), the IMS network (the SIP server 30a), the NGN network 30 (the SIP server 30b), or the VoIP network 40 (the SIP server 30c). At this time, the INVITE request contains an SDP parameter that causes call rejection on the receiver, i.e., the IMS terminal 50a, 50b or the IP telephone terminal 60 (INVITE (SDP mismatch)).

When the INVITE request arrives, the receiver: the IMS terminal 50a, 50b or the IP telephone terminal 60 rejects the INVITE request since its SDP parameter is different from a usable one and sends back a 488 error response ("Not Acceptable Here") as a response message. Through the receipt of the 488 error response, the telephone number research device 10 can accurately determine whether the IMS terminal 50a, 50b or the IP telephone terminal 60 is present by the mechanism described below.

Incidentally, there are four cases of SDP mismatch in the SDP negotiation procedure of the INVITE method: network protocol mismatch, media type mismatch, transport protocol mismatch, and codec mismatch. The telephone number research device 10 of this embodiment can accurately determine the usage status or validity of a telephone number by combining these cases.

According to RFC 5853 considered as the SBC standard, when a call is sent from an NGN network (IPv6) to a VoIP network that does not support IPv6, the network protocol is converted to the IPv4 network protocol suitable for the destination network. Specifically, the SBC 21 in the NGN network 20 has a function to convert the network protocol to the IPv4 network protocol when sending an SDP parameter (first SDP parameter) to the VoIP network 40. The telephone number research device 10 determines if the network protocol of an SDP parameter has been converted to determine whether the destination network is the IMS network 30 or the VoIP network 40.

Figure 2:
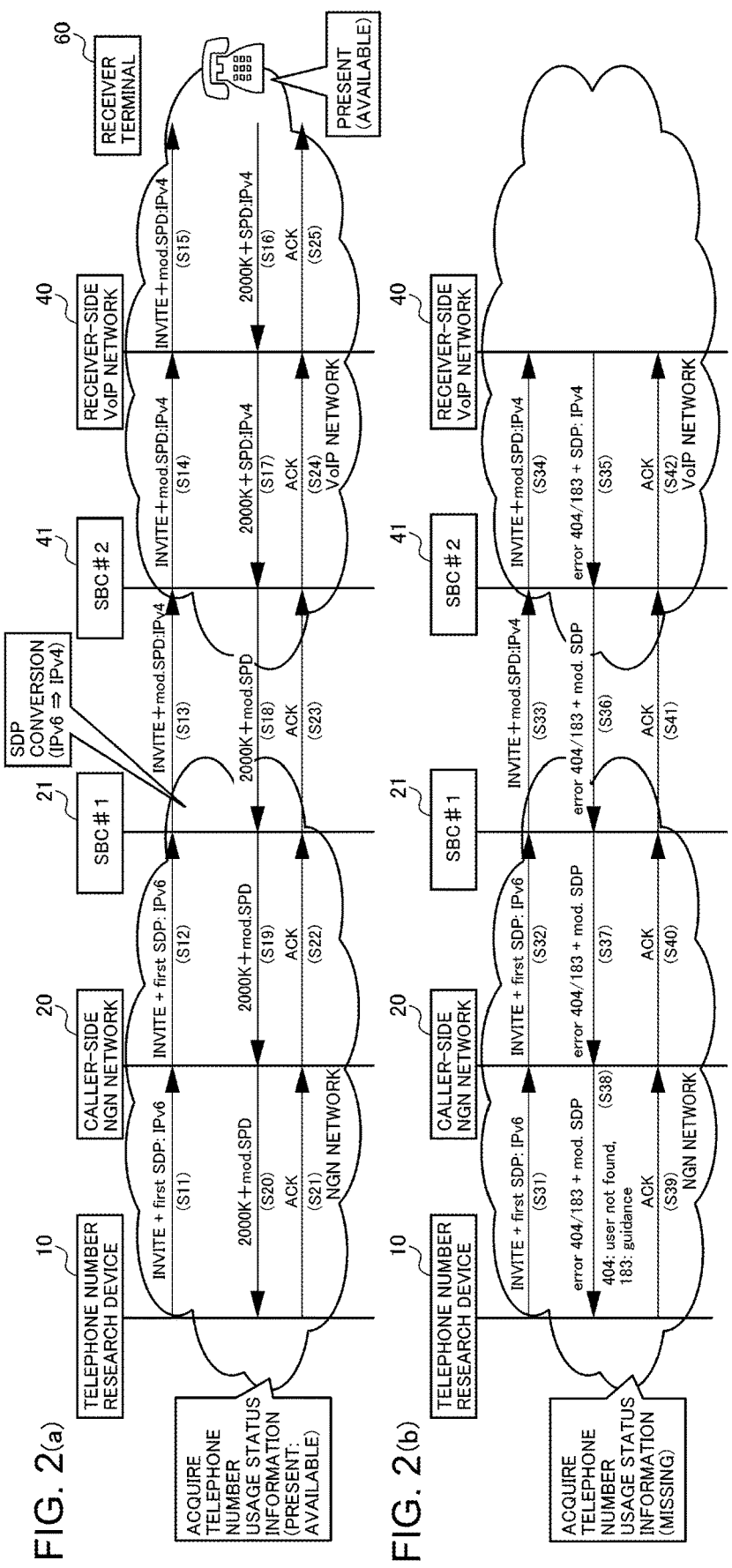
FIGS. 2 (a)-(b) are sequence diagrams for the operation of a telephone number research device according to an embodiment of the present invention, illustrating an example where a first SDP parameter is sent to a receiver-side VoIP network.

FIGS. 2 (a)-(b) are sequence diagrams for the operation of the telephone number research device of this embodiment, illustrating an example where a first SDP parameter is sent to a receiver-side VoIP network. FIGS. 2 (a)-(b) illustrate an SDP negotiation procedure among the telephone number research device 10, the caller-side NGN network 20, the caller-side SBC 21, the receiver-side SBC 41, the receiver-side VoIP network 40, and the IP telephone terminal 60.

As illustrated in FIG. 2(a), through the receiver-side IP telephony network 40 managed by the VoIP carrier that is the contract carrier of the IP telephone terminal 60 to be researched, the telephone number research device 10 sends an INVITE request to the IP telephone terminal 60 via the NGN network 20. At this time, the INVITE request contains an SDP parameter (first SDP parameter) including information that causes call rejection on the receiver IP telephone terminal 60 (steps S11 to S12: INVITE+first SDP: IPv6). In this example, the NGN network 20 supports IPv6, and the SDP parameter includes the IPv6 network protocol.

The SBC 21 on the NGN network 20 side performs a mismatch correction function to match the SDP parameter of the INVITE request with the function of the VoIP network 40 and rewrites (SDP-converts) the SDP parameter to conform to IPv4. The SBC 21 sends the converted INVITE request (INVITE+mod. SDP: IPv4) forward to the VoIP (IPv4) network 40 (step S13). The SBC 41 in the VoIP network 40 sends the converted INVITE request (INVITE+mod. SDP: IPv4) to the receiver terminal 60 (steps S14 to S15).

In response, the receiver IP telephone terminal 60 sends back a response message (200 OK+SDP: IPv4) (steps S16 to S17). The SBC 41 in the VoIP network 40 converts the SDP parameter returned from the receiver terminal 60 and sends the response message (200 OK+mod. SDP) to the SBC 21 on the NGN network 20 side (step S18). The SBC 21 on the NGN network 20 side sends the converted response message (200 OK+mod. SDP) to the telephone number research device 10.

Having received the response message "200 OK+mod. SDP", the telephone number research device 10 determines that the destination network is the VoIP network 40. Furthermore, upon receipt of the response message "200 OK+mod. SDP", the telephone number research device 10 determines that the telephone number of the IP telephone terminal 60 is real and present. When the destination network is the VoIP network 40 as a result of the network determination, the telephone number research device 10 sends an ACK request as confirmation from a VoIP SIP transmitter to the receiver IP telephone terminal 60 (steps S21 to S25).

Next, with reference to FIG. 2(b), an example will be described in which the destination network is a VoIP network and a telephone number is missing. The telephone number research device 10 sends an INVITE request via the NGN network 20 to the receiver-side VoIP network 40 managed by the VoIP carrier that is the contract carrier of the IP telephone terminal 60 to be researched. At this time, the INVITE request contains an SDP IPv6 parameter including information that causes call rejection on the receiver (steps S31 to S32: INVITE+first SDP: IPv6).

The SBC 21 on the NGN network 20 side performs a mismatch correction function to match the SDP parameter of the INVITE request with the function of the VoIP network 40 and rewrites the SDP parameter to conform to IPv4. The SBC 21 sends the converted INVITE request (INVITE+mod. SDP: IPv4) forward to the VoIP (IPv4) network 40 (step S33). The SBC 41 in the VoIP network 40 sends the converted INVITE request (INVITE+mod. SDP: IPv4) to the destination network, i.e., the VoIP network 40 (step S34).

In response, the receiver-side VoIP network 40 sends back a response message (error 404/183+SDP: IPv4) with the SDP parameter and an error code (step S35). The SBC 41 in the VoIP network 40 converts the SDP parameter of the response message and sends the response message (error 404/183+mod. SDP) to the SBC 21 on the NGN network 20 side (step S36). The SBC 21 on the NGN network 20 side sends the converted response message (error 404/183+mod. SDP) to the telephone number research device 10 (steps S37 to S38).

Having received the response message that is an error response including the error code (404/183) (steps S35 to S38), the telephone number research device 10 obtains the usage status (missing) of the telephone number of the IP telephone terminal 60 and determines that the telephone number is missing. When the destination network is the VoIP network 40 as a result of the network determination, the telephone number research device 10 sends an ACK request as confirmation from a VoIP SIP transmitter to the receiver IP telephone terminal 60 (steps S39 to S42). Incidentally, the error response 404 code indicates that the user is not found, and the 183 code indicates a guidance response.

Figure 3:
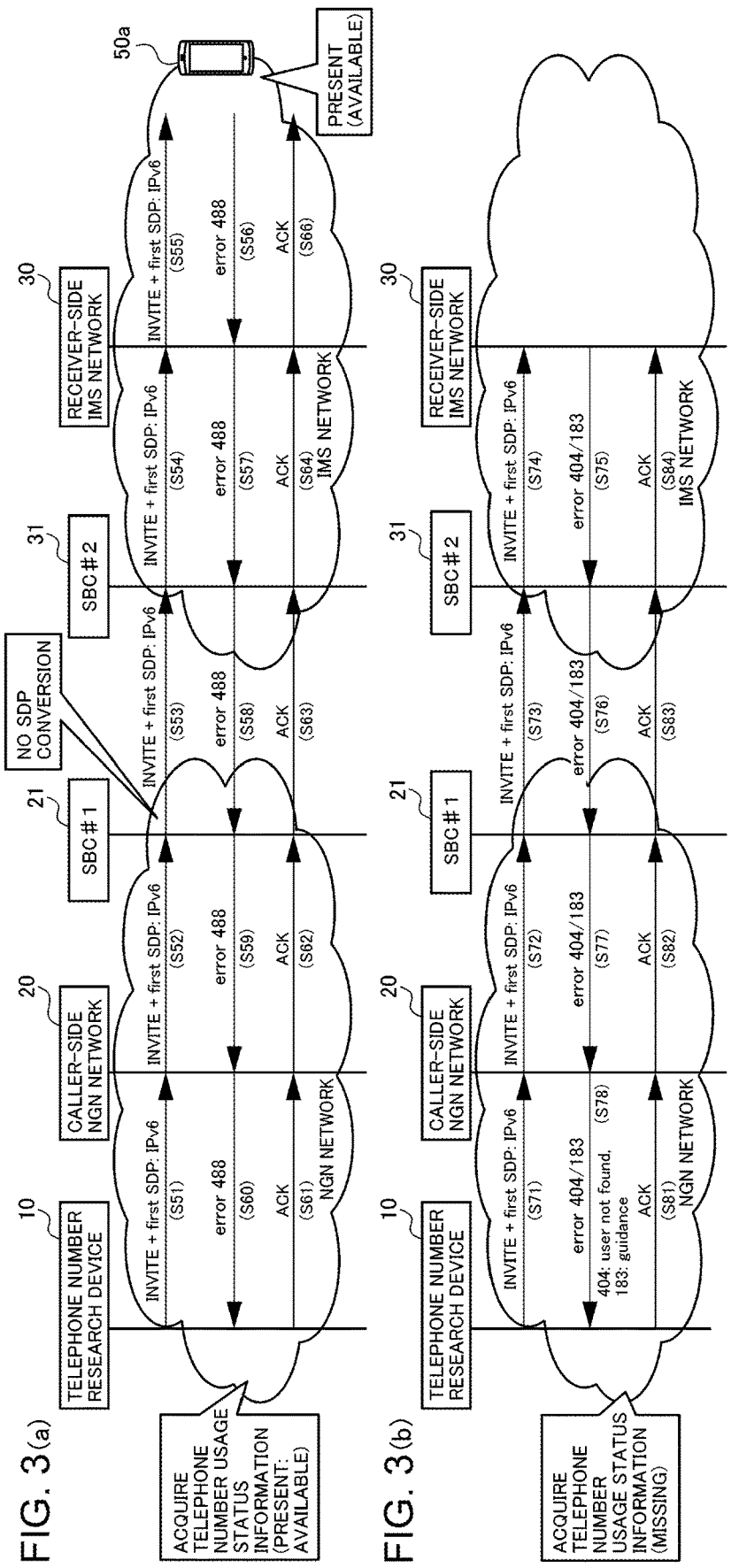
FIGS. 3 (a)-(b) are sequence diagrams for the operation of a telephone number research device according to an embodiment of the present invention, illustrating an example where a first SDP parameter is sent to a receiver-side IMS network.

FIGS. 3 (a)-(b) are sequence diagrams for the operation of the telephone number research device of this embodiment, illustrating an example where a first SDP parameter is sent to a receiver-side IMS network. FIGS. 3 (a)-(b) illustrate an SDP negotiation procedure among the telephone number research device 10, the caller-side NGN network 20, the caller-side SBC 21, the receiver-side SBC 31, the receiver-side IMS network 30, and the IMS terminal 50a (50b).

As illustrated in FIG. 3(a), through the receiver-side IMS network 30 such as a mobile telephone network managed by the contract carrier of the IMS terminal 50a (50b) to be researched, the telephone number research device 10 sends an INVITE request to the IMS terminal 50a (50b) via the NGN network 20. At this time, the INVITE request contains an SDP parameter (first SDP parameter) including information that causes call rejection on the receiver IMS terminal 50a (50b) (steps S51 to S55: INVITE+first SDP: IPv6).

If the destination network is the IMS network 30 that supports IPv6, the SBC 21 on the NGN network 20 does not convert the network protocol. When the INVITE request arrives, the receiver IMS terminal 50a (50b) rejects the INVITE request since its SDP parameter is different from a usable one and sends back a 488 error response (steps S56 to S60).

Through the receipt of the 488 error response, the telephone number research device 10 can accurately obtain the usage status (real/present, available) of the telephone number of the IMS terminal 50a (50b).

Upon receipt of the 488 error response through the NGN network 20, the telephone number research device 10 sends an ACK request as confirmation to the receiver IMS terminal 50a (50b) via the caller-side SBC, the receiver-side SBC of the contract carrier, and the IMS network 30 (steps S61 to S66). As described above, the telephone number research device 10 of this embodiment performs a 3-way handshake: INVITE request/488 error response/ACK request for researching the usage status of a telephone number, thereby improving the reliability of communication.

FIG. 3(b) illustrates a case where the telephone number of the receiver IMS terminal 50a (50b) is missing. In this case, the telephone number research device 10 sends an INVITE request to the receiver IMS terminal 50a (50b) via the NGN network 20 and the IMS network 30 (steps S71 to S74). As a result, the telephone number research device 10 receives a 404/183 error response from the receiver-side IMS network 30 (the SIP server 30a (30b)) (steps S75 to S78), thus obtaining the usage status (missing) of the telephone number. Upon receipt of the 404 error response, the telephone number research device 10 sends an ACK request as confirmation to the IMS network 30 via the NGN network 20 (steps S81 to S84)

Figure 4:
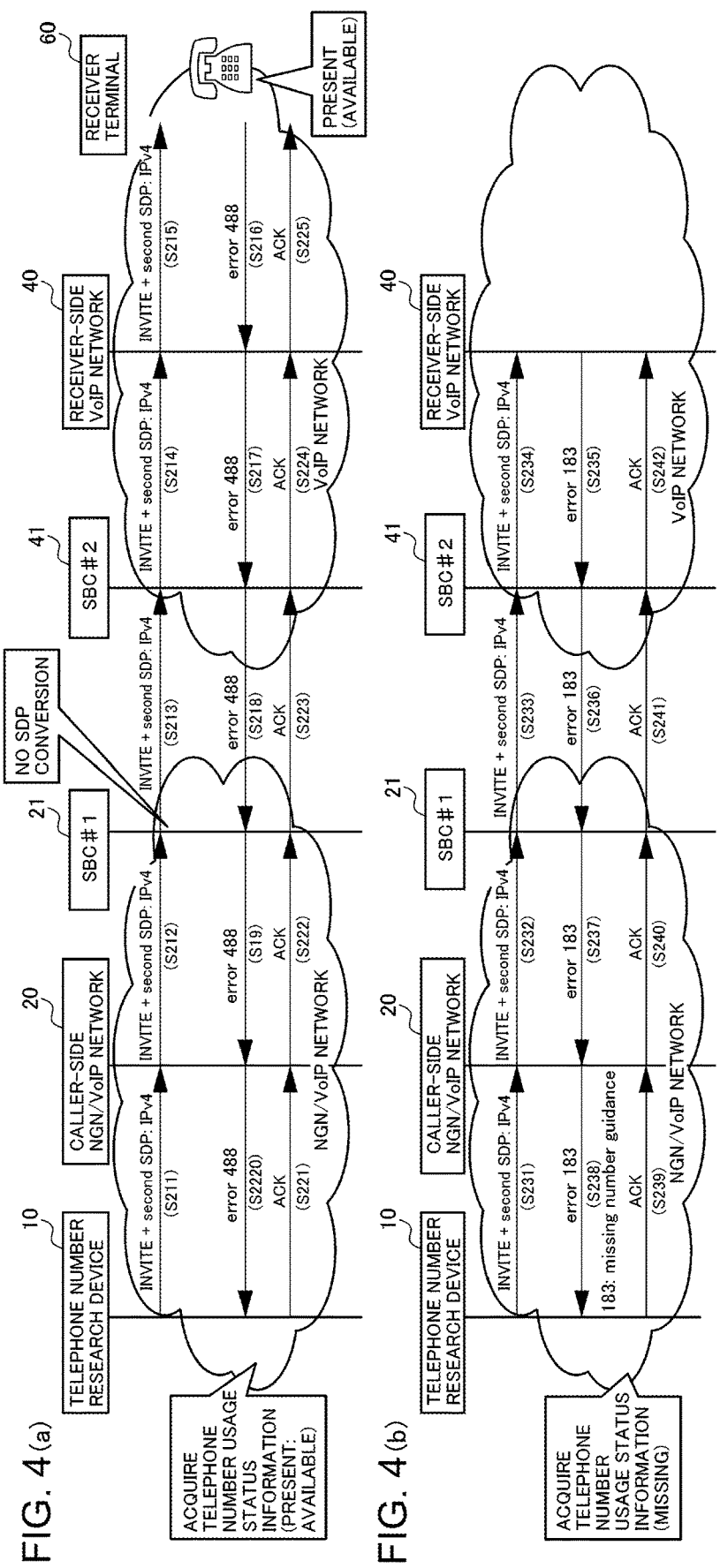
FIGS. 4 (a)-(b) are sequence diagrams for the operation of a telephone number research device according to an embodiment of the present invention, illustrating an example where a second SDP parameter is sent to a receiver-side VoIP network.

FIGS. 4 (a)-(b) are sequence diagrams for the operation of the telephone number research device of this embodiment, illustrating an example where a second SDP parameter is sent to a receiver-side VoIP network.

As illustrated in FIG. 4(a), through the receiver-side IP telephony network 40 managed by the VoIP carrier that is the contract carrier of the IP telephone terminal 60 to be researched, the telephone number research device 10 sends an INVITE request to the IP telephone terminal 60 via the NGN network 20. At this time, the INVITE request contains a second SDP parameter including information that causes call rejection on the receiver IP telephone terminal 60 (steps S211 to S212: INVITE+second SDP: IPv4). Two of the four parameters that can cause an SDP mismatch: network protocol (IPv4) and media type (audio) are fixed. Therefore, the second SDP parameter includes a description of at least one or a combination of a transport protocol and a codec so that it can cause call rejection on the IP telephone.

Because of not having to match the second SDP parameter of the INVITE request with the function of the VoIP network 40, the SBC 21 on the NGN network 20 side sends the INVITE request (INVITE+second SDP: IPv4) forward to the VoIP (IPv4) network 40 without SDP conversion (step S213). The SBC 41 in the VoIP network 40 sends the received INVITE request (INVITE+second SDP: IPv4) to the receiver terminal 60 (steps S214 to S215).

When the INVITE request arrives, the receiver IP telephone terminal 60 rejects the INVITE request since its SDP parameter is different from a usable one and sends back a 488 error response (steps S216 to S217). The SBC 41 in the VoIP network 40 sends the 488 error response from the receiver terminal 60 to the SBC 21 on the NGN network 20 side (step S218). The SBC 21 on the NGN network 20 side sends the 488 error response to the telephone number research device 10.

Through the receipt of the 488 error response, the telephone number research device 10 can accurately obtain the usage status (real/present, available) of the telephone number of the receiver terminal 60. The telephone number research device 10 then sends an ACK request as confirmation from a VoIP SIP transmitter to the receiver IP telephone terminal 60 (steps S221 to S225).

FIG. 4(b) illustrates a case where the destination network is a VoIP network and a telephone number is missing. In this case, the telephone number research device 10 sends an INVITE request to the receiver IP telephone terminal 60 via the NGN network 20 and the VoIP network 40 (steps S231 to S234). As a result, the telephone number research device receives an error response including an error code (183) as a response message (steps S235 to S238), thus obtaining the usage status (missing) of the telephone number of the IP telephone terminal 60. With this, the telephone number research device 10 determines that the telephone number is missing. The telephone number research device 10 then sends an ACK request as confirmation from a VoIP SIP transmitter to the receiver IP telephone terminal 60 (steps S239 to S242). Incidentally, the 183 code in the error response indicates a guidance response.

Figure 5:
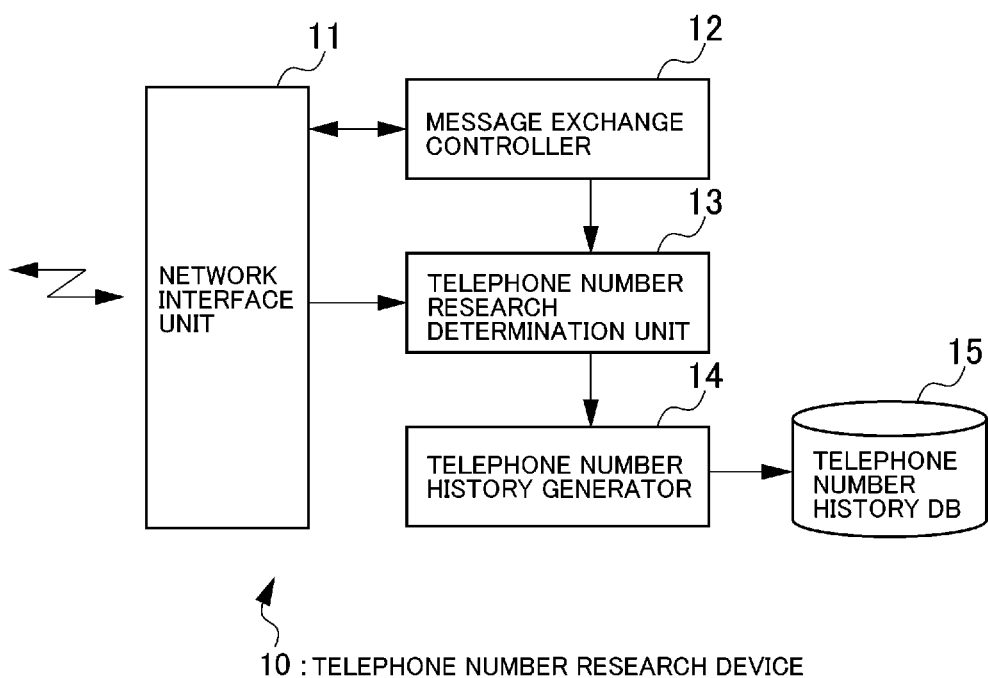
FIG. 5 is a block diagram illustrating the configuration of a telephone number research device according to an embodiment of the present invention.

FIG. 5 is a block diagram illustrating the configuration of the telephone number research device 10 according to the embodiment. As illustrated in FIG. 5, the telephone number research device 10 of this embodiment includes a network interface unit 11, a message exchange controller 12, a telephone number research determination unit 13, a telephone number history generator 14, and a telephone number history database (DB) 15.

The network interface unit 11 provides a communication interface that allows the telephone number research device to perform communication conforming to the SIP protocol. The message exchange controller 12 sends an INVITE request that causes an SDP mismatch to the IMS terminal 50a, 50b or the IP telephone terminal 60, and receives a message (error response) from the SIP server 30a, 30b of the receiver-side IMS network 30 or the SIP server 30c of the VoIP network 40. Note that the SDP parameter added to cause an SDP mismatch may be any one of "network protocol", "media type", "transport protocol", and "codec", or a combination thereof, which are not available to the receiver: the IMS terminal 50*a*, 50*b* or the IP telephone terminal 60.

The message exchange controller 12 sends a message with an SDP parameter that contains at least one of a network protocol, a media type, a transport protocol, and a codec, or a combination thereof, which are not available to the receiver: the IMS terminal 50*a*, 50*b* or the IP telephone terminal 60.

The telephone number research determination unit 13 determines the validity of a telephone number, such as whether the receiver: the IMS terminal 50*a*, 50*b* or the IP telephone terminal 60 is present or not, based on an error response received through the message exchange controller 12. When a response message indicates call rejection, the telephone number research determination unit 13 determines that the telephone number of the IMS terminal 50*a*, 50*b* or the IP telephone terminal 60 is real and present.

Having received, for example, an error code 488 (first error code) through the message exchange controller 12, the telephone number research determination unit 13 determines that the telephone number of the receiver researched: the IMS terminal 50*a*, 50*b* or the IP telephone terminal 60 is real and present. Upon receipt of, for example, an error code 404 (second error code) or an error code 183 (third error code), the telephone number research determination unit 13 determines that the telephone number is missing.

When receiving an error code 488 (first error code) as a response message from the IMS network 30 (the SIP server 30*a*, 30*b*) through the message exchange controller 12, the telephone number research determination unit 13 may determine that the telephone number of the receiver IMS terminal 50*a*, 50*b* researched is "present in an available state". On the other hand, when receiving, for example, an error code 486 (fourth error code) through the message exchange controller 12, the telephone number research determination unit 13 may determine that the telephone number of the receiver IMS terminal 50*a*, 50*b* researched is "present in a busy state".

When receiving an error code 404 (second error code) as a response message from the IMS network 30 (the SIP server 30*a*, 30*b*) through the message exchange controller 12, the telephone number research determination unit 13 may determine that the telephone number of the receiver IMS terminal 50*a*, 50*b* researched is "missing in a cancelled state and no user found".

When receiving an error code 488 (first error code) as a response message from the VoIP network 40 (the SIP server 30*c*) through the message exchange controller 12, the telephone number research determination unit 13 may determine that the telephone number of the receiver IP telephone terminal 60 researched is "present in an available state".

When receiving an error code 183 (third error code) as a response message from the VoIP network 40 (the SIP server 30*c*) through the message exchange controller 12, the telephone number research determination unit 13 may determine that the telephone number of the receiver IP telephone terminal 60 researched is "missing".

The telephone number history generator 14 assigns a timestamp indicating the determination date and time to each of the determination results of the telephone number research determination unit 13 and records them in chronological order on a recording medium, thereby constructing the telephone number history DB 15.

FIG. 8 illustrates an example of the data structure of the telephone number history DB 15. The telephone number history DB 15 stores telephone number history information. The telephone number history information includes, as indicated in the telephone number history information layout, "telephone number" researched, "new subscriber number" which is a new or contact telephone number found during the research, "error code" returned from the destination network, "research date" (timestamp), and "other layer information" regarding a layer used for response from the destination network, which are stored and registered for each research.

As another way to create telephone number history information, for example, when research is conducted on the usage status of a telephone number "03-3359-0906", research information is stored in the above layout for each determination of the telephone number research determination unit 13 and sequentially accumulated as history information. Further to the above data items, the telephone number history DB 15 may also additionally store the name of the corporation or individual that owns the phone number, attribute information such as an address, age, and the like, map link information, and credit information for evaluating creditworthiness.

Referring back to FIG. 5, the network interface unit 11, the message exchange controller 12, the telephone number research determination unit 13, and the telephone number history generator 14 can be each realized by a microprocessor with a built-in or external memory that stores a program and large scale integration (LSI) circuitry for peripheral control including communication. The microprocessor sequentially fetches instructions of the program from the memory and executes them, thereby implementing the functions of the telephone number research device 10.

Specifically, the program implements the following functions: adding an SDP parameter that causes call rejection on the IMS terminal 50*a* (50*b*) to the SDP parameter of an INVITE request, sending the INVITE request through the NGN network 20 to the IMS terminal 50*a* (50*b*) via the IMS network 30, which is the destination network selected by the NGN network 20 for each contract carrier of the IMS terminal 50*a* (50*b*); and determining the telephone number usage status of the IMS terminal 50*a* (50*b*) based on a response message from the IMS network 30 (the IMS terminal 50*a* (50*b*)), which is the destination network selected by the NGN network 20.

The telephone number history DB 15 is stored in a large-capacity recording medium including a semiconductor memory and an optical memory such as a hard disk or a digital versatile disc (DVD).

(Operation of Embodiment)

Figure 6:
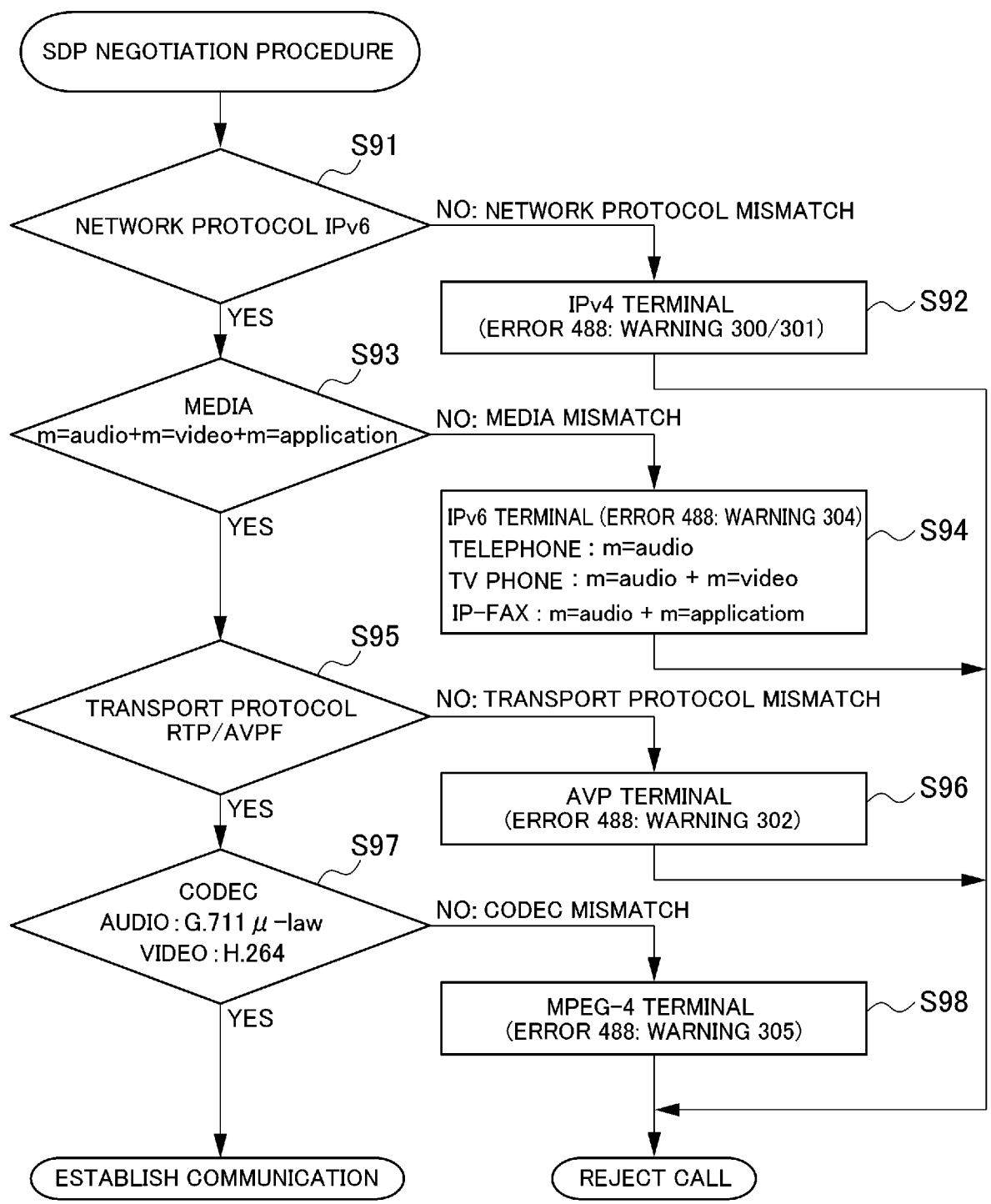
FIG. 6 is a flowchart illustrating a procedure for establishing a communication session based on an SDP description in a telephone number research device according to an embodiment of the present invention.

In the following, with reference to the flowchart of FIG. 6 illustrating an SDP negotiation procedure in the IMS network 30, a description will be given of a procedure for establishing a communication session based on an SDP description in the telephone number research device 10 of the embodiment illustrated in FIG. 5.

As illustrated in FIG. 6, the telephone number research device 10 (the message exchange controller 12) negotiates with the IMS terminal 50*a*, 50*b*, the subject of telephone number research, to establish a communication session based on the description of SDP parameters in the following order: check the network protocol (step S91), check the media type (step S93), check the transport protocol of the media (step S95), and check the codec (step S97).

This example assumes that in the negotiation procedure for establishing communication in the NGN network 20, an offer is made with SDP parameters describing, for example, network protocol: IPv6, media type: terminal compatible with all media types (m=audio+m=video+m=application), transport protocol: RTP/AVPF, and video codec: H.264.

First, in the check of the network protocol (step S91), when the receiver IMS terminal 50*a*, 50*b* is implemented with an IPv4 terminal that does not support IPv6 (step S91: NO), the IPv4 terminal replies to the message exchange controller 12 with an error code 488 (warning code 300/301) indicating a network protocol mismatch (step S92). On the other hand, when the receiver IMS terminal 50*a*, 50*b* is implemented with an IPv6 terminal (step S91: YES), the process proceeds to the check of the media type (step S93). In this step, if the SDP description contains even one media type (m) that the IPv6 terminal does not support (step S93: NO), the receiver IMS terminal 50*a*, 50*b* replies with an error code 488 (warning code 304) indicating a media type mismatch (step S94).

Incidentally, examples of the IPv6 terminal incompatible with the media include a telephone that supports only audio (m=audio), a TV phone that does not support an application (m=application), and an IP-FAX that does not support video (m=video).

When the receiver IMS terminal 50*a*, 50*b* is implemented with a terminal compatible with all media types (step S93: YES), the process then proceeds to the check of the transport protocol (step S95). In this step, even when compatible with all media types as per the SDP description, if the receiver IMS terminal 50*a*, 50*b* or IP telephone terminal 60 is an AVP terminal that does not support the transport protocol (RTP/AVPF) set forth in the SDP description (step S95: NO), it replies with an error code 488 (warning code 302) (step S96).

On the other hand, when the terminal supports the transport protocol set forth in the SDP description (step S95: YES), the process then proceeds to the check of the codec (step S97). In this step, when the terminal does not support the codec set forth in the SDP description (step S97: NO), specifically, if the receiver IMS terminal 50*a*, 50*b* is implemented by a terminal that uses a video codec with a lower quality and compression ratio than H.264 such as MPEG-4, the terminal that uses a codec other than H.264 sends back an error code 488 (warning code 305) to the telephone number research device 10 (the message exchange controller 12) (step S98).

If all the four SDP parameters are met, communication is established, and the telephone number research device 10 can accurately determine the validity of the telephone number of the receiver IMS terminal 50*a*, 50*b*. If any of the four SDP parameters is not met, the terminal sends an error code 488, and the call is rejected.

In the NGN network 20, it is possible to set the four parameters that cause call rejection in the above communication establishment procedure. With all the four SDP parameters of network protocol, media type, transport protocol, and codec, the validity of the telephone number can be accurately determined without using a signal that rings an incoming call.

Differently from the SDP negotiation procedure in an IMS network illustrated in FIG. 6, two parameters of transport protocol and codec that cause call rejection are used in a VoIP network where the network protocol (IPv4) and media type (audio) are fixed. In this case also, the validity of the telephone number can be accurately determined without using a signal that rings an incoming call.

Figure 7:
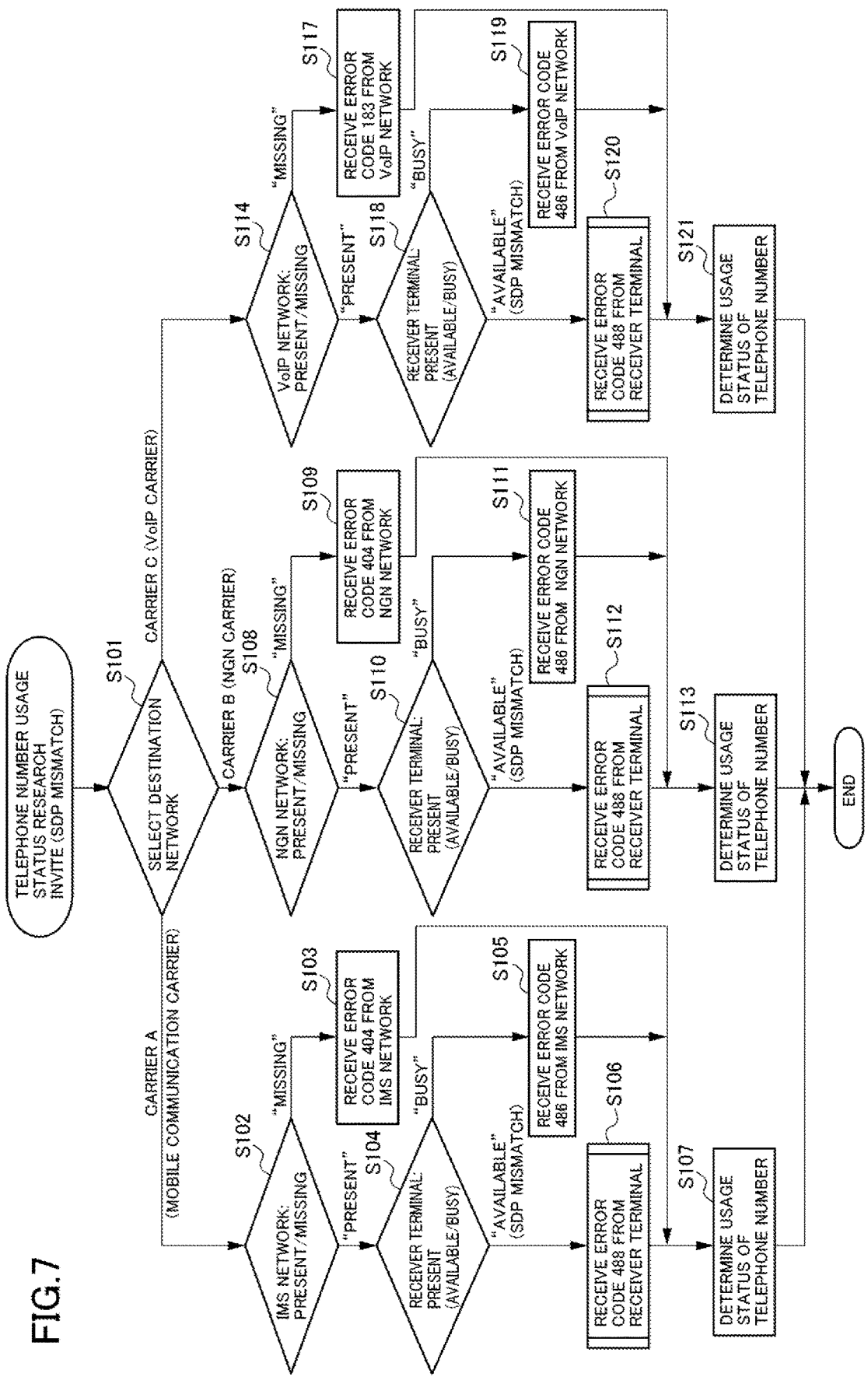
FIG. 7 is a flowchart illustrating an algorithm for determining the usage status of a telephone number in a telephone number research device according to an embodiment of the present invention.

Next, a telephone number research method according to the embodiment will be described with reference to the flowchart of FIG. 7 illustrating an algorithm for researching the usage status of a telephone number. The telephone number research method can be realized by causing a computer to perform each of the steps described below.

The message exchange controller 12 sends an INVITE request to the IMS terminal 50*a*, 50*b* or the IP telephone terminal 60 to be researched via the IMS network 30 or the VoIP network 40, which is the destination network selected by the NGN network 20 for each contract carrier. At this time, the telephone number research device 10 adds an SDP parameter that causes call rejection on the IMS terminal 50*a*, 50*b* or the IP telephone terminal 60 to the SDP parameter of the INVITE request.

If the contract carrier of the IMS terminal 50*a*, 50*b* or the IP telephone terminal 60 to be researched is a mobile communication carrier A (step S101: carrier A), the telephone number research determination unit 13 receives a response to the INVITE request that has caused an SDP mismatch from the receiver IMS terminal 50*a* via the IMS network 30 of the contract carrier A and interprets it, thereby determining whether the telephone number is present or missing (step S102).

The telephone number research determination unit 13 determines that the telephone number is missing (step S102: missing) upon receipt of an error code 404 from the receiver-side IMS network 30 as described with reference to the sequence diagrams of FIGS. 3(*a*) and 3(*b*). In other words, the telephone number research determination unit 13 interprets a response (error code 404 or 183) to the INVITE request received due to an SDP mismatch from the IMS network 30, which is the destination network selected, to make the determination (steps S103 and S107).

If the IMS terminal 50*a* researched is present (step S102: present), the telephone number research determination unit 13 determines whether the IMS terminal 50*a* is available or busy (step S104). As described with reference to the sequence diagrams of FIGS. 2(*a*) and 2(*b*), when receiving, for example, an error code 486 as a response to the INVITE request due to an SDP mismatch from the IMS network 30, which is the destination network selected, the telephone number research determination unit 13 determines that the receiver IMS terminal 50*a* is busy (step S104: busy) by interpreting the response (steps S105 and S107). On the other hand, when receiving a response (error code 488) to the INVITE request due to an SDP mismatch, the telephone number research determination unit 13 determines that the receiver IMS terminal 50*a* is available (step S104: available) by interpreting the response (steps S106 and S107).

Regarding the usage status of the telephone number of the receiver IMS terminal 50*a* determined in step S107, the telephone number history generator 14 generates telephone number history information as in, for example, the telephone number history information layout illustrated in FIG. 8 based on the determination result of the telephone number research determination unit 13. The telephone number history information is stored in the telephone number history DB 15 each time generated.

Here, the error code can be used to determine whether the destination network is an IMS or VoIP network and the usage status of the telephone number. By creating a database of information on the network determination, the information can be used for future telephone number research. The telephone number history information in the telephone number history DB 15 is edited in an appropriate format when accumulated for a certain period of time and is distributed for search to those who are interested as a telephone number usage status research recording medium.

If the contract carrier of the IMS terminal 50*a*, 50*b* or the IP telephone terminal 60 to be researched is an NGN carrier B (step S101: carrier B), the telephone number research determination unit 13 receives a response to the INVITE request that has caused an SDP mismatch from the receiver IMS terminal 50b via the NGN network 30 of the contract carrier B and interprets it, thereby determining whether the telephone number is present or missing (step S108).

The telephone number research determination unit 13 determines that the telephone number is missing (step S108: missing) by interpreting a response (error code 404 or 183) to the INVITE request received due to an SDP mismatch from the NGN network 30, which is the destination network selected (steps S103 and S109).

If the IMS terminal 50b researched is present (step S108: present), the telephone number research determination unit 13 determines whether the IMS terminal 50b is available or busy (step S110). When receiving a response (error code 486) to the INVITE request due to an SDP mismatch from the NGN network 30, which is the destination network selected, the telephone number research determination unit 13 determines that the receiver IMS terminal 50b is busy (step S110: busy) by interpreting the response (steps S111 and S113). On the other hand, when receiving a response (error code 488) to the INVITE request due to an SDP mismatch, the telephone number research determination unit 13 determines that the receiver IMS terminal 50b is available (step S110: available) by interpreting the response (steps S112 and S113).

Regarding the usage status of the telephone number of the IMS terminal 50b determined in step S113, the telephone number history generator 14 generates telephone number history information as in the telephone number history information layout illustrated in FIG. 8 based on the determination result of the telephone number research determination unit 13. The telephone number history information is stored in the telephone number history DB 15 each time generated. The telephone number history information in the telephone number history DB 15 is edited in an appropriate format when accumulated for a certain period of time and is distributed for search to those who are interested as a telephone number usage status research recording medium.

If the contract carrier of the IMS terminal 50a, 50b or the IP telephone terminal 60 to be researched is a VoIP carrier C (step S101: carrier C), the telephone number research determination unit 13 receives a response to the INVITE request that has caused an SDP mismatch from the receiver IP telephone terminal 60 via the VoIP network 40 of the contract carrier C and interprets it, thereby determining whether the telephone number is present or missing (step S114).

The telephone number research determination unit 13 determines that the telephone number is missing (step S114: missing) by interpreting a response (error code 183) to the INVITE request received due to an SDP mismatch from the VoIP network 40, which is the destination network selected (steps S117 and S121).

If the IP telephone terminal 60 is present (step S114: present), the telephone number research determination unit 13 determines whether the terminal 60 is available or busy (step S118). When receiving a response (error code 486) to the INVITE request due to an SDP mismatch from the VoIP network 40, which is the destination network selected, the telephone number research determination unit 13 determines that the receiver IP telephone terminal 60 is busy (step S118: busy) by interpreting the response (steps S119 and S121). On the other hand, when receiving a response (error code 488) to the INVITE request due to an SDP mismatch, the telephone number research determination unit 13 determines that the receiver IP telephone terminal 60 is available (step S118: available) by interpreting the response (steps S120 and S121).

Regarding the usage status of the IP telephone number determined in step S121, the telephone number history generator 14 generates telephone number history information as in the telephone number history information layout illustrated in FIG. 8 based on the determination result of the telephone number research determination unit 13. The telephone number history information is stored in the telephone number history DB 15 each time generated. The telephone number history information in the telephone number history DB 15 is edited in an appropriate format when accumulated for a certain period of time and is distributed for search to those who are interested as a telephone number usage status research recording medium.

Incidentally, in the case of a telephone that is assigned a telephone number in the same format as the conventional subscriber number such as a fiber-optic IP phone, it is not possible to distinguish whether the destination network is an IMS (NGN) network or a VoIP network due to local number portability (LNP). Also, parameters for SDP mismatch are different between the IMS (NGN) network and the VoIP network.

Specifically, while the IMS (NGN) network 30 supports both IPv4 and IPv6 network protocols, the VoIP network 40 supports only IPv4 and does not support IPv6. In addition, although the IMS (NGN) network 30 supports both audio and video media types, the VoIP network 40 supports only audio. Therefore, after determining the destination network to which an IP phone is connected, the telephone number research device 10 needs to set SDP parameters corresponding to each network.

Figure 9:
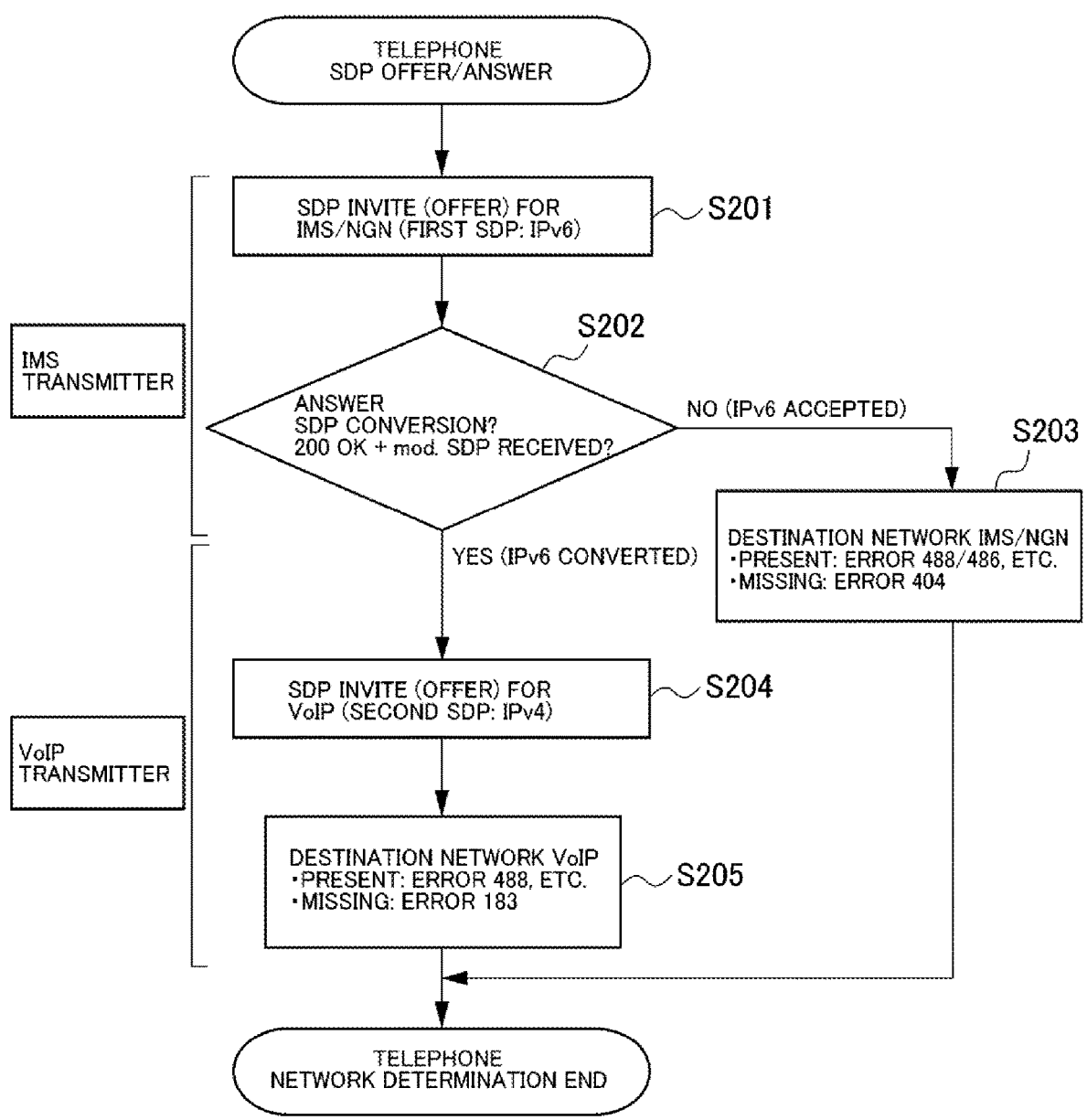
FIG. 9 is a flowchart illustrating a procedure for determining a destination network in a telephone number research device according to an embodiment of the present invention.

In the following, a procedure for determining the destination network of a call to an IP phone assigned a OAB-J number will be described in detail with reference to the flowchart of FIG. 9 illustrating a destination network determination procedure, assuming that the IP phone is the IMS terminal 50b connected to the IMS (NGN) network 30 or the IP telephone terminal 60 connected to the VoIP network 40.

In FIG. 9, in the telephone number research device 10, first, the message exchange controller 12 makes an offer or sends an INVITE request to an IP phone (the IMS terminal 50b or the IP telephone terminal 60) to be researched with a first SDP parameter that conforms to an IMS (NGN) network in which, for example, IPv6 is set as the network protocol, or audio, video, and application (audio+video+application) are set as the media type (step S201). It will be assumed in this example that IPv6 is set as the network protocol.

Next, when receiving a response message (200 OK+mod. SDP) as an answer to the INVITE request that contains the first SDP parameter from the destination network (step S202: YES), the message exchange controller 12 determines that the IP telephone terminal 60 is the IP phone to be researched. The message exchange controller 12 then transmits an INVITE request from a VoIP SIP transmitter with a second SDP parameter that conforms to a VoIP network, in which IPv4 is set as the network protocol (the media type is audio only) (step S204).

As an answer to the INVITE request sent as an offer in step S204, the telephone number research determination unit 13 acquires a response message through the message exchange controller 12. The telephone number research determination unit 13 determines that the telephone number assigned to the IP telephone terminal 60 researched is present if the response message includes an error code 488, and determines that the telephone number is missing if the response message includes an error code 183 (step S205).

When receiving a response message that accepts IPv6, in which the network protocol of the SDP parameter has not been converted, as an answer from the destination network (step S202: NO), the telephone number research determination unit 13 determines that the IMS terminal 50b is the IP phone to be researched. The telephone number research determination unit 13 also determines that the telephone number is present if the response message includes an error code 488 or 486, and determines that the telephone number is missing if the response message includes an error code 404 (step S203).

(Effect of Embodiment)

As described above, according to the embodiment, the telephone number research device 10 can research the usage status of a telephone number in the IMS network 30 using an IMS interconnection interface or the like for interconnection between carriers. Therefore, with a SIP-based telephone number research tool having connectivity to the NGN network 20, a smooth transition to the new system platform can be achieved.

Furthermore, according to the embodiment, since the IMS network 30 for each carrier, the destination network, is selected on the NGN network 20 side, the telephone number research device 10 can handle the mobile number portability (MNP), which allows a mobile telephone user to change from one carrier to another and keep the same phone number. As a result, unlike the case of UNI connection, connecting to a wrong network (a telephone terminal having a telephone number to be researched is connected to another network) does not occur. Thereby, the procedure of telephone number research is simplified, which reduces the load on the telephone number research device 10 to make a determination. In addition, the cost of capital investment can be reduced as it is sufficient to install the telephone number research device 10 and the line only in the NGN network 20.

In the above embodiment, the telephone number research device 10 is described using mobile telephones such as the IMS terminals 50a, 50b and the IP telephone terminal 60 as examples of telephone terminals to be researched. Examples of the IP telephone terminal 60 include IP phones that are assigned a telephone number in the same format as conventional subscriber telephones such as metal IP phones and fiber optic phones. The telephone number research device can accurately determine whether a telephone number is valid or invalid in research regardless of the type of IP phone and the destination network.

These telephone terminals check network protocol, media type, transport protocol of media, and codec in this order based on the description of SDP parameters in a negotiation to establish a communication session. In the NGN network, four parameters that cause call rejection can be set in this negotiation procedure as in the IMS network. By using all of the four parameters, it is possible to make an accurate determination. On the other hand, for the IP telephone terminal 60, two of the parameters that cause call rejection: network protocol (IPv4) and media type (audio) are fixed, and therefore the other two: transport protocol and codec are used. In this case also, the validity can be accurately determined without using a signal that rings an incoming call on the receiver IP telephone terminal 60.

There may be a case where it is not possible to distinguish whether the destination network is an IMS (NGN) network or a VoIP network due to LNP, and parameters for SDP mismatch that are sent to a telephone (the IMS terminal 50b, the IP telephone terminal 60) vary depending on the destination network. In such case, the message exchange controller 12 adds a first SDP parameter that conforms to the NGN network 30, in which IPv6 is set as the network protocol, to an INVITE request when sending the INVITE request to an IP phone to be researched, and sends the request to the IMS network 30 or the VoIP network 40, which is the destination network for each contract carrier selected through the NGN network 20. Then, the destination network to which the IP phone to be researched is connected is determined based on a response message received from the destination network. If the response message is "200 OK" or the first SDP parameter has been converted, it is determined that the destination network is a VoIP network. With this, the telephone number research determination unit 13 determines the telephone number usage status of the IP phone based on the response message received through the message exchange controller 12. Thus, according to the embodiment, the telephone number research device 10 can perform accurate verification regardless of the destination network.

As described above, according to the embodiment, the telephone number research device 10 can accurately determine whether the telephone numbers of the IMS terminals 50a, 50b and the IP telephone terminal 60 are in service (valid (present)), not in service (invalid (missing)), or has been changed. Also, if a call does not reach the destination, it is possible to completely stop some billing that may have occurred so far. In addition, a tool is provided that can store the determination result together with the determination date and time in a recording medium (the telephone number history DB 15). For example, as in the example data structure illustrated in FIG. 8, the recording medium may store the determination result, information on a new telephone number linked to the old one, and the determination date and time for each telephone number researched.

(Program)

According to an embodiment, for example, a program can realize the telephone number research device 10 that, as illustrated in FIG. 1, establishes a connection to a telephone (the IMS terminal 50b, the IP telephone terminal 60) connected to the IMS (NGN) network 30 or the VoIP network via the NGN network 20.

For example, as illustrated in FIGS. 1 and 9, the program may cause a computer (the telephone number research device 10) to perform at least the following steps: adding a first SDP parameter to an INVITE request for a telephone to be researched and sending it to the destination network selected by the NGN network (step S201), receiving a first response message that contains the first SDP parameter from the destination network (step S202), determining the usage status of the telephone number of the telephone based on the first response message (steps S203 to S205), wherein the first SDP parameter includes at least an IPv6 network protocol, and it is determined that the destination network is a VoIP network when the first response message is "200 OK" or the network protocol of the first SDP parameter has been converted, while it is determined that the destination network is an IMS network when the first SDP parameter of the first response message has not been converted and the response message includes a first error code (error 488) (step S202).

According to the embodiment, the program, which includes instructions that are fetched sequentially from a memory (not illustrated) and executed on the telephone number research device 10, enables research on the usage status of a telephone number in the IMS network 30 using an IMS interconnection interface or the like for interconnection between carriers. Therefore, with a SIP-based telephone number research tool having connectivity to the NGN network 20, a smooth transition to the new system platform can be achieved. In particular, the telephone number usage status of a telephone (the IMS terminal 50*b* or the IP telephone terminal 60) can be determined regardless of the type of the destination network (the IMS (NGN) network 30, the VoIP network 40).

(Telephone Number Research Information Provision System)

Figure 10:
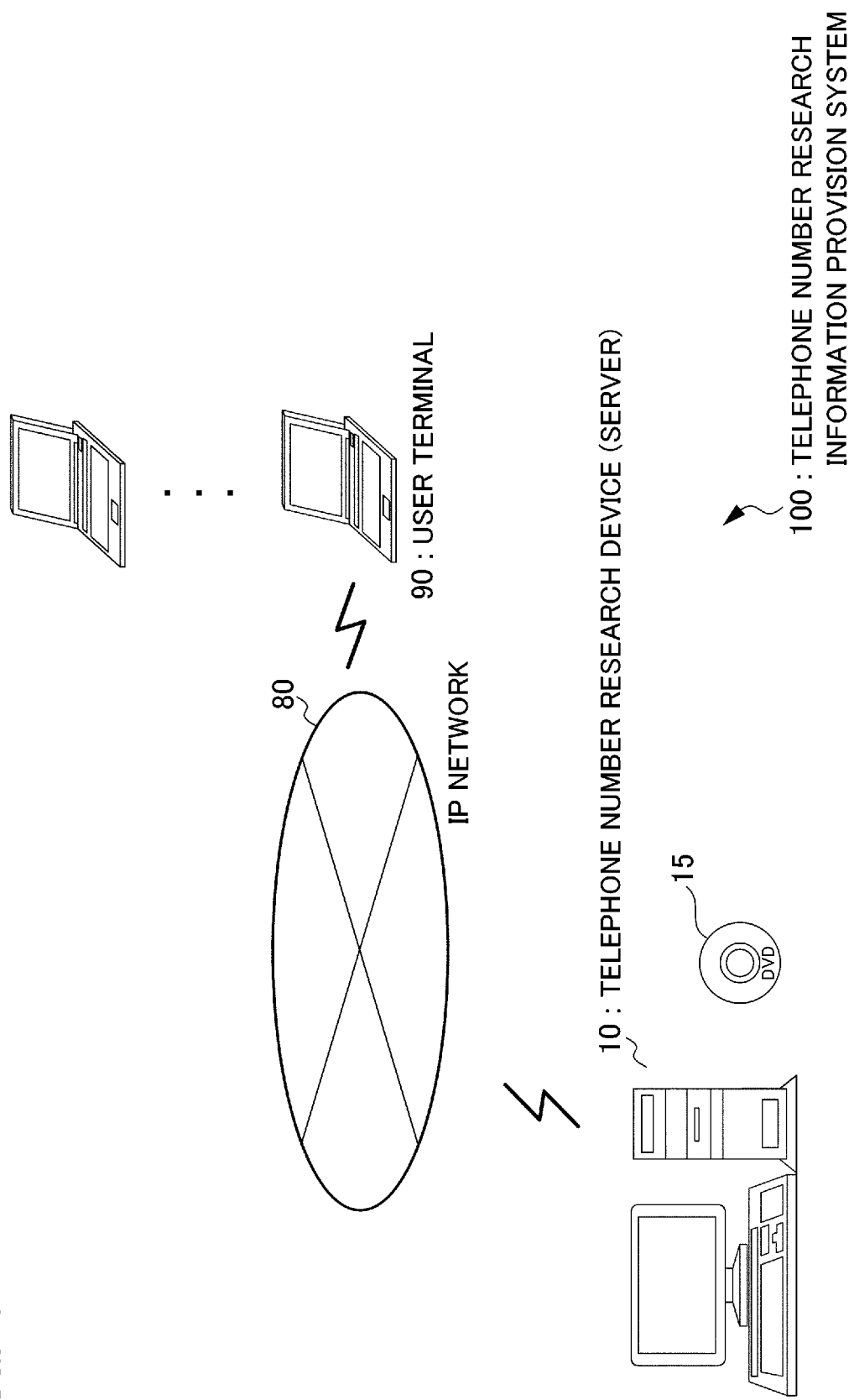
FIG. 10 is a diagram illustrating the configuration of a telephone number research information provision system according to an embodiment of the present invention.

FIG. 10 is a diagram illustrating the configuration of a telephone number research information provision system 100 according to an embodiment. As illustrated in FIG. 10, the telephone number research information provision system 100 of the embodiment includes one or more user terminals 90 and a telephone number research server (the telephone number research device 10 in FIG. 1) that is connected to the user terminals 90 via an IP network 80. The server is also connected to another network (not illustrated).

Upon receipt of a request for information on telephone number research based on a target telephone number from the user terminal 90 via the IP network 80, the telephone number research server 10 adds a first SDP parameter to an INVITE request for a telephone to be researched (the IMS terminal 50*b*, the IP telephone terminal 60) and sends the INVITE request to the IMS network 30 or the VoIP network 40, which is the destination network for each contract carrier of the telephone selected through the NGN network 20. Having received a response message from the destination network, the telephone number research server 10 determines that the destination network is a VoIP network when the response message is "200 OK" or the first SDP parameter has been converted. On the other hand, if the first SDP parameter of the response message has not been converted and the response message includes a first error code (error 488), the telephone number research server 10 determines that the destination network is an IMS network. Then, the telephone number research server 10 determines the telephone number usage status of the telephone based on the received response message, and sends the determination result to the user terminal 90 that has requested the telephone number research information via the IP network 80. For this purpose, the telephone number research server 10 has a function of providing the user terminal 90 with information on the telephone number usage status of a telephone terminal determined by the telephone number research determination unit 13 in response to a telephone number research information request for the telephone terminal received from the user terminal 90 through the network interface unit 11 illustrated in FIG. 5.

At this time, in response to a request for information on telephone number research based on a target telephone number from the user terminal 90 via the IP network 80, the telephone number research server 10 refers to a recording medium (the telephone number history DB 15) that stores telephone number research information consisting of determination results that are each assigned a timestamp indicating the determination date and time and recorded in chronological order. Thereby, the telephone number research server 10 sends the telephone number research information to the user terminal 90 that has requested the information via the IP network 80.

The telephone number research information recording medium (the telephone number history DB 15) may be distributed independently to users who need it. The recording medium (the telephone number history DB 15) is created by the telephone number research device 10 that is connected to a telecommunications carrier network via a dedicated line to record information on the presence or absence of target telephone numbers. The recording medium may be used for search on a system where it is distributed.

The telephone number research information recording medium (the telephone number history DB 15) stores a collection of determination results as to the usage status or validity of telephone numbers of telephone terminals on the receiver side. For example, the recording medium has a data structure as illustrated in FIG. 8, in which determination results are each assigned a timestamp indicating the determination date and time and recorded in chronological order. The database need not necessarily be distributed on a recording medium such as DVD and hard disk, it may also be distributed via a communication line.

According to the embodiment, the telephone number research device 10 determines whether a telephone number is in service (valid (present)), not in service (invalid (missing)), or has been changed (in a state where voicemail announces a new phone number), and the telephone number research information provision system 100 can provide the information to a user who needs it. In addition, the telephone number research information recording medium (the telephone number history DB 15) may be distributed to users who need it so that they can utilize it for, for example, evaluating creditworthiness or the like.

Although specific embodiments of the invention have been described and illustrated, it is to be understood that the invention is not to be limited to the embodiments disclosed herein. As would be apparent to those skilled in the art, various changes, modifications, and alterations may be made within the scope of the invention as defined in the appended claims.

LIST OF REFERENCE SIGNS

10 Telephone number research device (server)
11 Network interface unit
12 Message exchange controller
13 Telephone number research determination unit
14 Telephone number history generator
15 Telephone number history DB (telephone number research information recording medium)
20 NGN network
21 SBC
20*a* SIP server
30 IMS (NGN) network
30*a*, 30*b*, 30*c* SIP server
31 SBC
40 VoIP network
41 SBC
50*a* IMS terminal (mobile telephone)
50*b* IMS terminal (IP phone)
60 IP telephone terminal (IP phone)
80 IP network
90 User terminal
100 Telephone number research information provision system

The invention claimed is:

1. A telephone number research device configured to be connected via a next-generation network (NGN) to a telephone connected to at least a destination network that is an IP multimedia subsystem (IMS) network or a voice over IP (VoIP) network, the device being characterized in comprising:
 a message exchange controller configured to add a first session description protocol (SDP) parameter to an INVITE request for the telephone to be researched, send the INVITE request to the destination network selected by the NGN, and receive a first response message from the destination network; and a telephone number research determination unit configured to determine a usage status of a telephone number of the telephone based on the first response message, wherein the INVITE request does not include a signal that causes the telephone to ring for an incoming call, the first SDP parameter includes at least an IPv6 network protocol, a session border controller (SBC) has a function to convert the IPv6 network protocol to an IPv4 network protocol suitable for the destination network when the first SDP parameter is sent from the NGN to the destination network, the message exchange controller is further configured to:
    determine that the destination network is the VoIP network when the first response message is "200 OK" or the first SDP parameter has been converted, and
    determine that the destination network is the IMS network when the first SDP parameter has not been converted and the first response message includes a first error code, and
the usage status of the telephone number indicates at least whether the telephone number is valid or invalid.

2. The telephone number research device according to claim 1, wherein when the first response message is "200 OK" or the first SDP parameter has been converted, the message exchange controller adds a second SDP parameter to an INVITE request for the telephone to be researched upon sending the INVITE request from next time.

3. The telephone number research device according to claim 2, wherein
    the first SDP parameter is a parameter that conforms to the IMS network, and
    the second SDP parameter is a parameter that conforms to the VoIP network.

4. The telephone number research device according to claim 1, wherein
    the first SDP parameter is a parameter that causes call rejection on the telephone connected to the IMS network, and
    the first SDP parameter includes a description of at least one of network protocol, media type, transport protocol, and codec, or a combination thereof, which causes the call rejection.

5. The telephone number research device according to claim 1, wherein the first SDP parameter includes a description of all media types: audio, video, and application.

6. The telephone number research device according claim 3, wherein
    the second SDP parameter is a parameter that causes call rejection on the telephone connected to the VoIP network,
    the second SDP parameter includes a description of network protocol, media type, transport protocol, and codec, and
    the transport protocol, the codec, or a combination thereof is used to cause the call rejection since the network protocol (IPv4) and the media type (audio) are fixed.

7. The telephone number research device according to claim 1, wherein the telephone number research determination unit is further configured to:

determine that the telephone number of the telephone is present when the first response message includes the first error code, and determine that the telephone number of the telephone is missing when the first response message includes a second error code or a third error code.

8. The telephone number research device according to claim 2, wherein the telephone number research determination unit is further configured to:
    determine that the telephone number of the telephone is present when receiving a second response message that includes the first error code from the destination network in response to the second SDP parameter, and
    determine that the telephone number of the telephone is missing when the second response message includes a third error code.

9. A system comprising:
    the telephone number research device according to claim 1; and
    a user terminal,
    wherein the telephone number research device comprises a network interface unit that, in response to a request for telephone number research information about the telephone from the user terminal, sends information on the usage status of the telephone number of the telephone determined by the telephone number research determination unit via an IP network to the user terminal that has requested the telephone number research information.

10. A telephone number research method for researching a usage status of a telephone number of a telephone to be researched with a telephone number research device configured to be connected via a next-generation network (NGN) to the telephone connected to at least a destination network that is an IP multimedia subsystem (IMS) network or a voice over IP (VoIP) network, the method being characterized in comprising:
    adding a first session description protocol (SDP) parameter to an INVITE request for the telephone to be researched;
    sending the INVITE request to the destination network selected by the NGN;
    receiving a first response message from the destination network; and
    determining the usage status of the telephone number of the telephone based on the first response message, wherein
    the INVITE request does not include a signal that causes the telephone to ring for an incoming call,
    the first SDP parameter includes at least an IPv6 network protocol,
    a session border controller (SBC) has a function to convert the IPv6 network protocol to an IPv4 network protocol suitable for the destination network when the first SDP parameter is sent from the NGN to the destination network,
    the method further comprises:
        determining that the destination network is the VoIP network when the first response message is "200 OK" or the first SDP parameter has been converted, and
        determining that the destination network is the IMS network when the first SDP parameter has not been converted and the first response message includes a first error code, and
    the usage status of the telephone number indicates at least whether the telephone number is valid or invalid.

11. A computer program product for a telephone number research device configured to be connected via a next-generation network (NGN) to a telephone connected to at least a destination network that is an IP multimedia subsystem (IMS) network or a voice over IP (VoIP) network, the computer program product comprising a non-transitory computer-readable medium having a computer-readable program code embodied therein, the computer-readable program code causing a computer to perform at least the following:

adding a first session description protocol (SDP) parameter to an INVITE request for the telephone to be researched, wherein the first SDP parameter includes at least an IPv6 network protocol, and the INVITE request does not include a signal that causes the telephone to ring for an incoming call;

sending the INVITE request to the destination network selected by the NGN;

receiving a first response message from the destination network;

determining a usage status of a telephone number of the telephone based on the first response message, wherein the usage status of the telephone number indicates at least whether the telephone number is valid or invalid, determining that the destination network is the VoIP network when the first response message is "200 OK" or the first SDP parameter has been converted, and determining that the destination network is the IMS network when the first SDP parameter has not been converted and the first response message includes a first error code.

* * * * *